US012746689B2

(12) United States Patent
Zhang et al.

(10) Patent No.: US 12,746,689 B2
(45) Date of Patent: Sep. 29, 2026

(54) TENSION-TRACKING FOR SINGLE ROBOT WIRE HARNESSING

(71) Applicant: FANUC CORPORATION, Yamanashi (JP)

(72) Inventors: Xiang Zhang, Albany, CA (US); Hsien-Chung Lin, Fremont, CA (US); Yu Zhao, Santa Clara, CA (US)

(73) Assignee: FANUC Corporation, Yamanashi (JP)

( * ) Notice: Subject to any disclaimer, the term of this patent is extended or adjusted under 35 U.S.C. 154(b) by 16 days.

(21) Appl. No.: 19/063,707

(22) Filed: Feb. 26, 2025

(65) Prior Publication Data

US 2025/0289139 A1 Sep. 18, 2025

Related U.S. Application Data

(60) Provisional application No. 63/565,196, filed on Mar. 14, 2024.

(51) Int. Cl.
*B25J 9/16* (2006.01)
*B25J 11/00* (2006.01)
*B25J 13/08* (2006.01)
*B25J 19/02* (2006.01)

(52) U.S. Cl.
CPC ............. *B25J 11/005* (2013.01); *B25J 9/163* (2013.01); *B25J 13/085* (2013.01); *B25J 19/023* (2013.01)

(58) Field of Classification Search
CPC ........ B25J 11/005; B25J 9/163; B25J 13/085; B25J 19/023; B25J 9/1687; B25J 9/1697; B25J 9/00; B25J 19/00; B25J 9/1684; B25J 9/1664
See application file for complete search history.

(56) References Cited

U.S. PATENT DOCUMENTS

2024/0120697 A1* 4/2024 Einav ........................ B25J 11/00

OTHER PUBLICATIONS

She-et-al-2021-cable-manipulation-with-a-tactile-reactive-gripper.pdf (Yu She, Shaoxiong Wang, Siyuan Dong, Neha Sunil, Alberto Rodriguez and Edward Adelson, Cable manipulation with a tactile-reactive gripper, 2021, The International Journal of Robotics Research 40(12-14), 1385-1401) (Year: 2021).*
Jin, Shiyu, et al. "Robotic cable routing with spatial representation." IEEE Robotics and Automation Letters 7.2 (2022): 5687-5694.
Süberkrüb, et al. "Feel the tension: Manipulation of deformable linear objects in environments with fixtures using force information." 2022 IROS. IEEE, 2022.
(Continued)

*Primary Examiner* — Bao Long T Nguyen
(74) *Attorney, Agent, or Firm* — John A. Miller; Shumaker, Loop & Kendrick, LLP

(57) ABSTRACT

A system and method for routing and securing a cable to a plurality of fixtures mounted to a structure using a robot. The method includes grasping the cable; twisting the cable so as to provide a tension force on the cable; sliding the gripper along the twisted cable while the cable is under tension; generating a nonlinear cable dynamics model using a learning-based algorithm; generating robot motion command signals using the cable dynamic model; and controlling the motion of the robot using the robot motion command signals and robot pose and force measurements to route and secure the cable to the plurality of fixtures.

20 Claims, 5 Drawing Sheets

(56) References Cited

OTHER PUBLICATIONS

Chen, Kejia, et al. "Real-time Contact State Estimation in Shape Control of Deformable Linear Objects under Small Environmental Constraints." arXiv preprint arXiv:2401.17154 (2024).
Wilson, Achu, et al. "Cable Routing and Assembly using Tactile-driven Motion Primitives." arXiv preprint arXiv:2303.11765 (2023).
Galassi, Kevin, and Gianluca Palli. "Robotic wires manipulation for switchgear cabling and wiring harness manufacturing." 2021 4th IEEE International Conference on Industrial Cyber-Physical Systems (ICPS). IEEE, 2021.

* cited by examiner

TENSION-TRACKING FOR SINGLE ROBOT WIRE HARNESSING

CROSS-REFERENCE TO RELATED APPLICATIONS

This application claims the benefit of the filing date of U.S. Provisional Application No. 63/565,196, titled Tension-Tracking For Single Robot Wire Harnessing, filed Mar. 14, 2024.

BACKGROUND

Field

This disclosure relates generally to a robot system for manipulating a cable and, more particularly, to a robot system for routing a wire or cable to and through various fixtures, where the system employs a single robot using cable tension feedback.

Discussion of the Related Art

Various industries, such automotive, aerospace, medical, telecommunications, etc., often require the use of many wires, cables and wire harnesses to provide signals and power to various electrical devices and systems. For the automotive industry, a wiring harness may be a collection of electrical cables or wires that connect electrical and electronic components in a vehicle, such as sensors, electronic control units, batteries, actuators, etc. The wiring harness routes power and information to provide primary vehicle functions, such as steering and braking, as well as secondary vehicle functions, such as ventilation and infotainment. These wire harnesses need to be routed throughout the vehicle and coupled to fixtures when the vehicle is manufactured.

Modern vehicle manufacturing is highly automated and often uses robots to rout and connect wire harnesses to the fixtures. Using robots to rout wire harnesses creates a number of challenges, such as kinematic-based challenges because the wires and cables have an infinite degree of freedom, dynamic-based challenges because the wires and cables are deformable under contact and vision-based challenges because the wires and cables are thin and long. Two general techniques currently exist in the art to route cables and wire harnesses throughout a vehicle using a robot, namely, bimanual robot wire harnessing and single robot wire harnessing. Bimanual robot wire harnessing uses two robot arms to grasp and then position the wires and cables into the fixtures. However, this technique is expensive and introduces complexity into the system design. Single robot wire harnessing requires a tactile sensor on the fingertips of the robot to detect the wire pose and the grasping/shear force. However, such tactile sensors are expensive and fragile. Thus, improvements can be made.

SUMMARY

The following discussion discloses and describes a robot system for routing a wire or cable to and through various fixtures, where the system employs a single robot using cable tension feedback. The robot system employs a process that includes connecting an end of the cable to a fixed endpoint, mapping a location and pose of the fixtures relative to the robot, and capturing an image of the cable using a camera. The process also includes grasping the cable using a gripper on the robot and the image proximate the fixed endpoint, twisting the cable using the gripper so that there is a tension force on the cable between the gripper and the fixed endpoint, and sliding the gripper along the twisted cable away from the fixed endpoint and towards a target fixture while the cable is under tension. The process generates a nonlinear cable dynamics model using a learning-based algorithm, generates robot motion command signals using the cable dynamic model, and controls the motion of the robot using the robot motion command signals and robot pose and force measurements to route and secure the cable to the target fixture.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a robot system for routing a wire or cable to and through various fixtures, where the system employs a single robot using cable tension feedback, is merely exemplary in nature, and is in no way intended to limit the disclosure or its applications or uses.

As will be discussed in detail below, this disclosure proposes a robot wire harness manipulator system that employs a single robot using cable tension feedback. Compared to the known bimanual robot wire harnessing technique referred to above, the proposed robot wire harness manipulator system uses only one robot arm that reduces both the system cost and complexity. Further, compared to the known tactile sensing based single robot wire harnessing technique referred to above, the proposed robot wire harness manipulator system uses a built-in force sensor to keep the tension in the cable, and solves the harnessing problems more efficiently with improved robustness.

Figure 1:
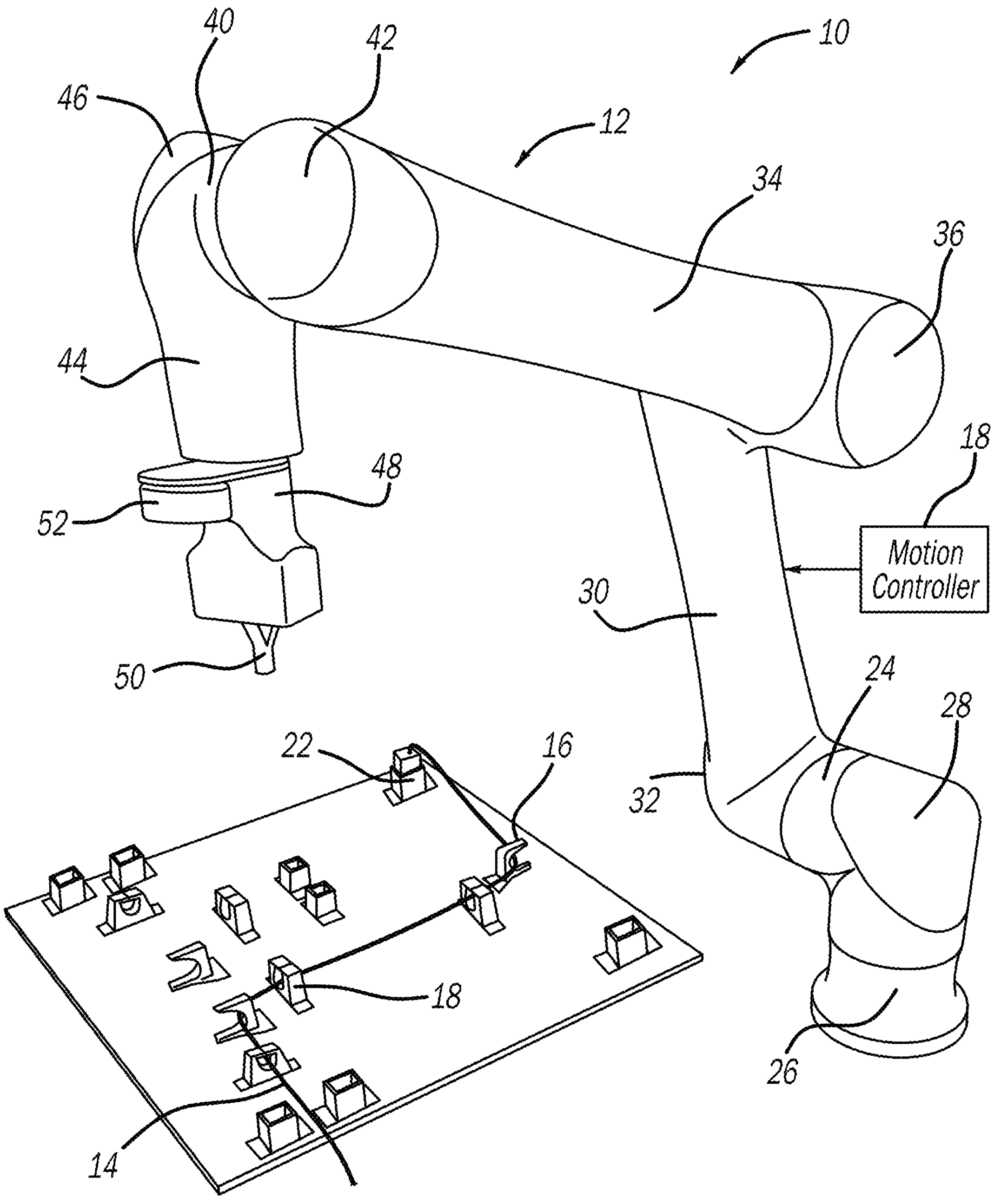
FIG. 1 is an isometric view of a robot system including a robot for routing a cable to and through support fixtures.

FIG. 1 is an isometric view of a robot system 10 including a six-axis robot 12 controlled by a motion controller 8 and that is configured for routing a wire or cable 14 to and through various support fixtures 16, for example, C-shaped fixtures 54 and U-shaped fixtures 56, secured to a structure 20, where one end of the cable 14 is secured to a fixed fixture 22, such as a cable connector. The robot 12 is intended to represent any robot suitable for the purposes discussed herein, and the structure 20 is intended to represent any structure, such as a vehicle structure, that could benefit from a robot providing wire harness routing. The robot 12 includes a base 24 rotatably mounted to a stand 26 by a joint 28, a first inner arm 30 coupled to the base 24 by a joint 32, and a second inner arm 34 coupled to the first inner arm 30 by a joint 36. A first outer arm 40 is coupled to the second inner arm 32 by a joint 42, a second outer arm 44 is coupled to the first outer arm 40 by a joint 46, and an end effector 48 having a gripper 50 is coupled to the second outer arm 44. A camera 52 is coupled to the end effector 48 and captures images of the cable 14, the fixtures 16 and the structure 20.

The robot 12 knows the location and orientation or pose of the fixtures 16 on the structure 20 by using, for example, an augmented reality tag 58 in a manner well understood by those skilled in the art. Other techniques are available, such as vision sensing, to determine the location and orientation or pose of the fixtures 16 on the structure 20. The robot 12 also knows what fixtures 16 the cable 14 will be secured to and the route that the robot 12 will take to move the cable 14 from one fixture 16 to the next fixture 16. Each time the cable 14 is secured to a certain fixture 16, that fixture 16 becomes a fixed point for routing the cable 14 to the next fixture 16, where the next fixture 16 from a designated fixed point fixture 16 is a target fixture 16.

Figure 2:
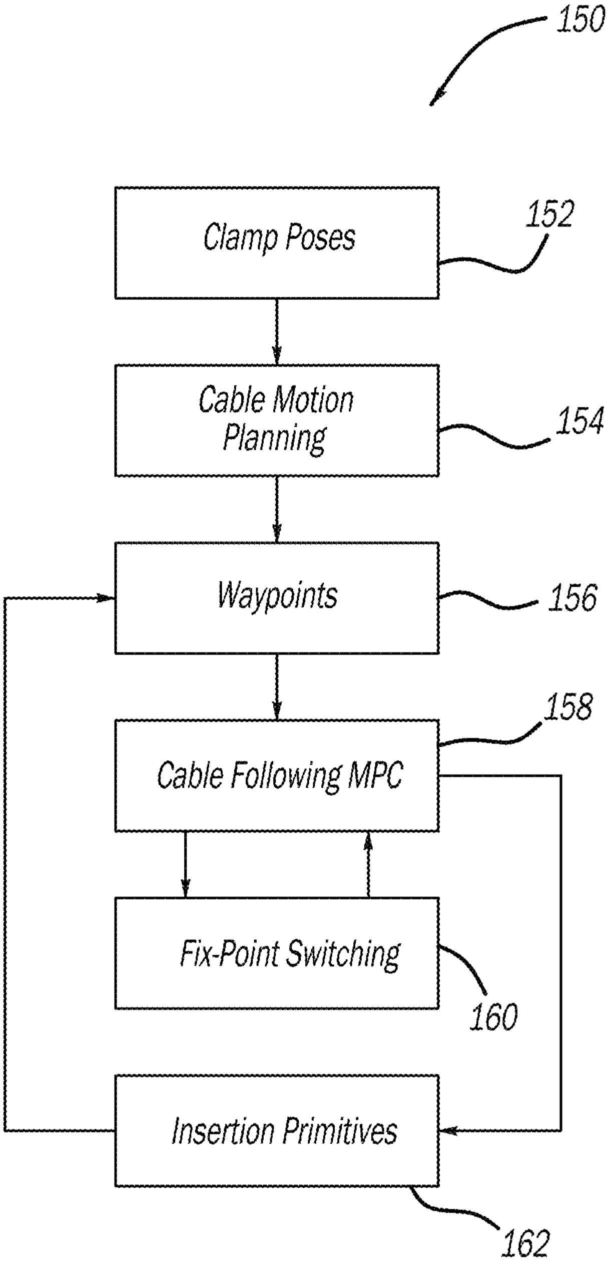
FIG. 2 is a flow diagram of a method for routing and connecting a cable to a series of fixtures.

FIG. 2 is a flow diagram 150 of a method for routing and connecting the cable 14 to the fixtures 16. The pose of all of the fixtures 16 is provided at box 152. Harness or cable motion planning is performed at box 154 that gives the complete path for routing the cable 14 to the fixtures 16, and that uses waypoints of the fixtures 16 on the structure 20 that are provided at box 156. The C-shaped fixtures 54 include three waypoints and the U-shaped fixtures 56 include two waypoints. The cable motion planning includes aligning the waypoints of each fixture 16 along the path and merging waypoints that are too close. Cable following is then performed at box 158 using model predictive control (MPC).

Once the cable 14 is secured to a particular fixture 16, then fix-point switching is performed at box 160, where the last fixture 16 is now the connection point. The cable following process may cause cable and assembly primitives to be inserted into the waypoints at box 162 to better align the cable 14 to the fixtures 16. A more detailed discussion of the cable routing process is provided below.

Figure 3:
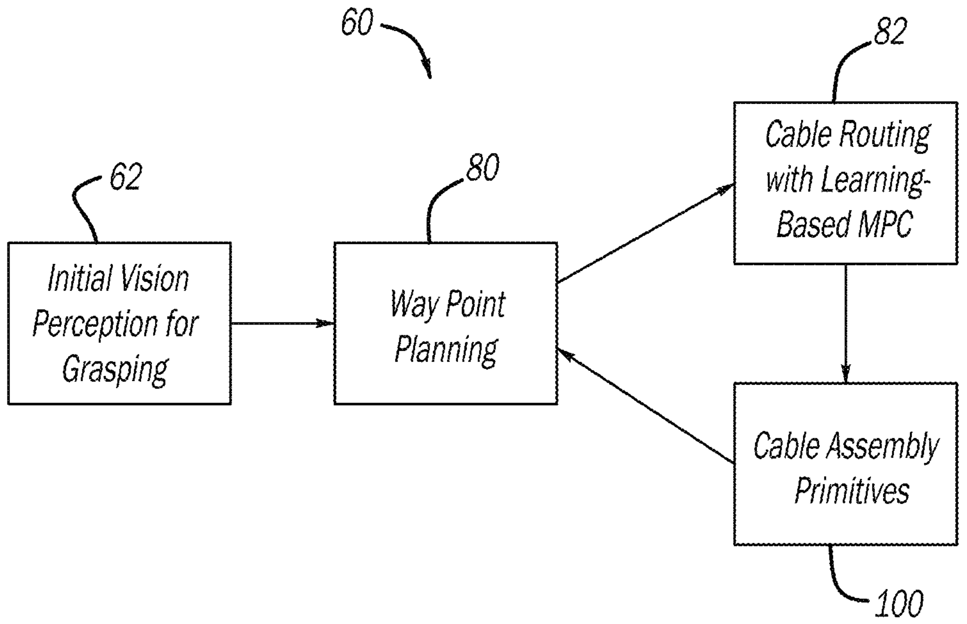
FIG. 3 is a general block diagram of a single robot wire harness manipulator system having force feedback.

FIG. 3 is a general block diagram of a single robot wire harness manipulator system 60 employing force or tension feedback, discussed in detail below, that is operable to route and insert the cable 14 into the fixtures 16. At box 62, the algorithm provides initial vision perception that identifies a location for the gripper 50 to grasp the cable 14, which is typically a point on the cable 14 close to the fixture 16 that is currently the fixed point fixture.

Figure 4:
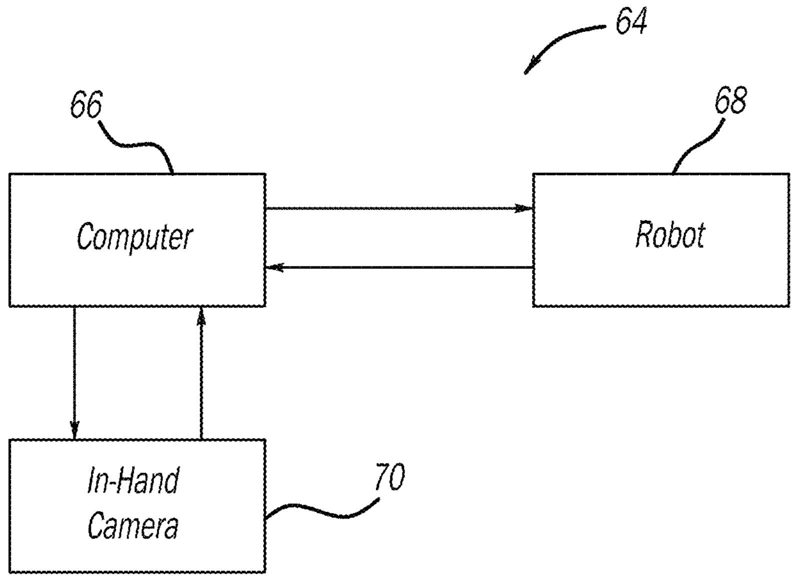
FIG. 4 is a block diagram of a robot system including robot vision perception for grasping a cable.

FIG. 4 is a block diagram of a robot system 64 showing robot vision perception for this purpose. The robot system 64 includes a routing computer 66, a robot 68 representing the robot 12 and a camera 70 representing the camera 52. The camera 70 sends images of the fixtures 16 to the computer 66, which determines a target pose of the cable 14 based on the images and sends a target pose signal to the robot 68. The robot 68 sends a robot pose signal to the computer 66, which sends the signal to the camera 70.

The system 60 provides waypoint planning at box 80 that includes assigning a plurality of waypoints 78 to each of the fixtures 16 that will receive the cable 14, where a waypoint is an intermediary point around and typically above the fixture 16. The C-shaped fixtures 54 will include one type of waypoint location and the U-shaped fixtures 56 will require another type of waypoint location. Any suitable algorithm can be employed to obtain the waypoints, such as Apriltags.

The system 60 employs cable routing with, for example, learning-based MPC, such as Koopman operator based MPC, which is an operator that provides a data-driven method for constructing control-oriented models of nonlinear systems, at box 82 to fit a nonlinear dynamics model to represent the tension force changes on the cable 14 with respect to the motion of the robot. The system 60 then employs the nonlinear dynamics model to follow the cable 14 while tracking the tension force on the cable 14. Although this discussion refers to MPC to provide the cable routing, other control techniques can be employed, such as proportional-derivative (PD) control. That process employs generating a dynamics model of the system as discussed below.

The following equations can also be employed to learn and implement the cable dynamics, specifically for a Koopman operator dynamic model.

The non-linear equation (1) could be linear in an embedding space.

$$S_{t+1} = f(S_t, u_t), \tag{1}$$

which gives the lift function:

$$g(x_t)\colon \mathbb{R}^n \to \mathbb{R}^m. \tag{2}$$

The approximated linear dynamics in the embedded space is:

$$g(s_{t+1}) = Kg(s_t) + Lu_t. \tag{3}$$

Model fitting is provided by:

$$L = \sum_{i=1}^{N-1} \left\| g(s_{i+1}) - [K, L]\begin{pmatrix} g(s_i) \\ u_i \end{pmatrix} \right\|_2^2, \tag{4}$$

$$\begin{bmatrix} g(s_i) \\ u_i \end{bmatrix} \text{ as } g'(s_i, u_i), \tag{5}$$

$$[K, L] = PG^t, \tag{6}$$

$$G = \frac{1}{N-1} \sum_{i=1}^{N-1} g'(s_i) g'(s_i)^T, \tag{7}$$

$$P = \frac{1}{N-1} \sum_{i=1}^{N-1} g(s_{i+1}) g'(s_i)^T, \tag{8}$$

Data is collected in real-world wire-following trajectories, and the lifted space is:

$$g(s_t) = (s_t, \phi_t, z(s_t))^T = (x_t, y_t, \theta_t, f_t, \phi_t, z(s_t))^T \tag{9}$$

$$z(s_t)\text{: 2 order polynomial of } (s_t, \phi_t)$$

The MPC formulation is:

$$\min_{u_i, \ldots u_i + H} \sum_{t=i}^{H} (g(s_t) - g_d)^T Q (g(s_t) - g_d) + u_t^T R u_t, \tag{10}$$

-continued $$g(s_{t+1}) = Kg(s_t) + Lu_t$$

$$b_l \leq Ag(s_{t+1}) \leq b_u$$

$$c_l \leq u_t \leq c_u, \forall t \in [i, i+H].$$

Figure 5:
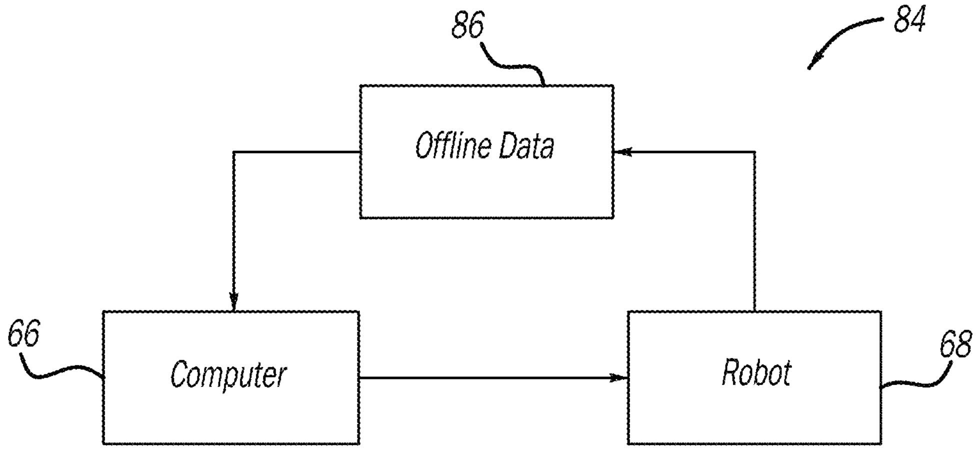
FIG. 5 is a block diagram of a robot system showing cable routing using learning-based model predictive control (MPC)

FIG. 5 is a block diagram of a robot system 84 illustrating learning a dynamics model to be employed in cable routing with MPC, where like elements to the system 64 are identified by the same reference number. The routing computer 66 provides pre-defined motion signals to the robot 68 and the robot 68 provides gripper pose and tension force signals to offline data at box 86. The computer 66 uses offline data to fit the cable dynamics.

Figure 6:
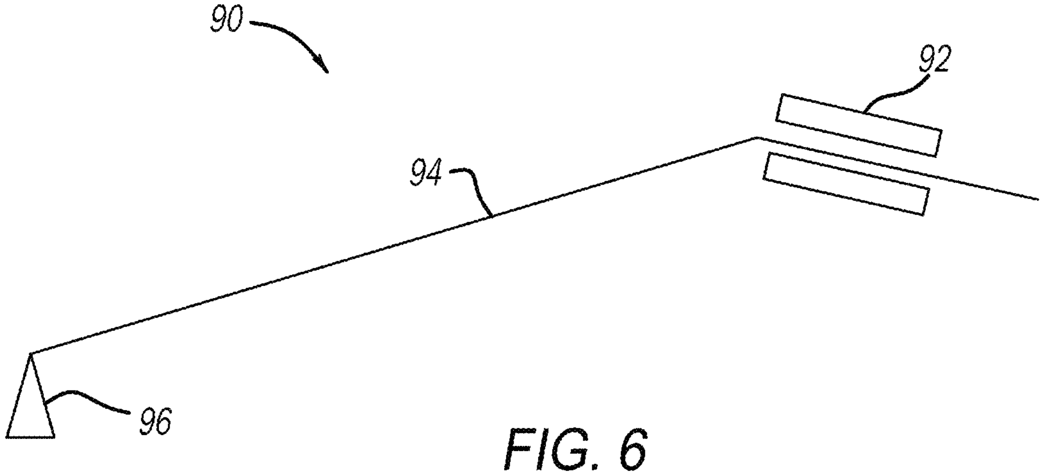
FIG. 6 is an illustration of a force feedback system illustrating a robot gripper applying force tension to a cable coupled to a fixed point.

FIG. 6 is an illustration of a force feedback system 90 showing a robot gripper 92, representing the gripper 50, applying a twisting force and tension to a cable 94, representing the cable 14, coupled to a fixed point 96. The gripper 92 grasps the cable 94 and provides tension thereto by twisting the cable 94 so that an angle of the cable 94 is provided between the gripper 92 and the fixed point 96, where the greater the twisting angle the greater the tension on the cable 94. The tension force on the cable 94 can be measured by six joint torque sensors on the robot 12, where the joint torque is mapped to the Cartesian space to obtain the tension force. The tension force can be measured in other ways, such as by using force sensors. By providing such a tension force on the cable 94 it is known that there will not be slack in the cable 94 and it can then be directly routed to the target fixture 16. When the gripper 92 grasps the cable 94 proximate to the fixed point 96 and provides tension thereto through the twisting motion, the gripper 92 will then slide along the cable 94 while the cable 94 is under tension as the robot 68 is moving the gripper 92 towards the target fixture 16.

The following equations can also be employed to learn and implement the cable dynamics. Equation (11) is the state $s_t$ of the model at time t, equation (2) is the input $u_t$ to the module at time t, and equation (13) is the state $s_{t+1}$ of the cable dynamics $f(s_t, u_t)$ at time t+1, where $|f_t|$ is the tension force on the cable 94, $(x_t, y_t)$ is the location of the gripper 92 relative to the location (0,0) of the fixed point 96 at time t, and $\theta_t$ is the angle of the gripper 92 at time t. The model maps the state $s_t$ to a latent space (s, z), where z includes two-order terms of the state s. Equation (14) fits the linear dynamics with, for example, forty real-word trajectories, i+1, to obtain the model learning, where K is a weighting function.

$$s_t = (x_t, y_t, \theta_t, |f_t|) \tag{11}$$

$$u_t = (\Delta x_t, \Delta y_t, \Delta\theta_t) \tag{12}$$

$$s_{t+1} = f(s_t, u_t) \tag{13}$$

$$(s_{i+1}, z_{i+1}) = (s_i, z_i)K_A^T + u_i K_B^T \tag{14}$$

The linear model of equation (14) obtained from collected data is then used as a constraint in an optimization formula of equation (15) to route the cable 14 to the next target fixture 16, where $s_i$ is the current state, $s_d$ is the desired state at the target fixture 16, R and Q are weighting factors to balance the force tracking and the robot pose tracking, and H is the prediction horizon and is, for example, 5.

$$\min \sum_{i=1}^{H} (s_i - s_d)^T Q (s_i - s_d) + u_i^T R u_i \tag{15}$$

The system 60 uses two primitive motions including assembly primitives that insert the cable 14 into the fixtures 16 while maintaining the tension on the cable 14 and cable primitives that collect data at box 100. The assembly primitives include pulling the gripper 50 along the cable 14 while the cable 14 is under tension as it is being directed to the target fixture 16 and the twisting angle on the cable 14 as the gripper 50 is being moved. The force and angle on the cable 14 and the position of the gripper 50 relative to the fixed point are measured and calculated to learn the dynamics on the cable 14. The assembly primitives for the C-shaped fixtures 54 are used as follows. In one embodiment, for a first side waypoint, the robot 12 moves down by 30 mm to lower its position for cable routing. After reaching a second side waypoint, the robot 12 moves up for 30 mm to avoid collision with the structure 20 and finishes the cable routing. The assembly primitives for the U-shaped fixtures 56 are used as follows. In one embodiment, after reaching a second side waypoint, the robot 12 first goes down 30 mm for insertion while twisting the cable 14 to maintain the cable tension. Then the robot 12 moves along the edge of the fixture 56 in two directions for 20 mm to further secure the cable 14. Finally, the robot 12 moves up 30 mm to finish the insertion of the cable 14 into the fixture 56. For the cable primitives, in one embodiment, forty real-world wire-following trajectories [τi=(s0, u0, . . . , sT, uT), i=1, . . . , 40] are collected as the dataset using a scripted twisting and stretching motion of the cable 14 with random initial states.

Figure 7:
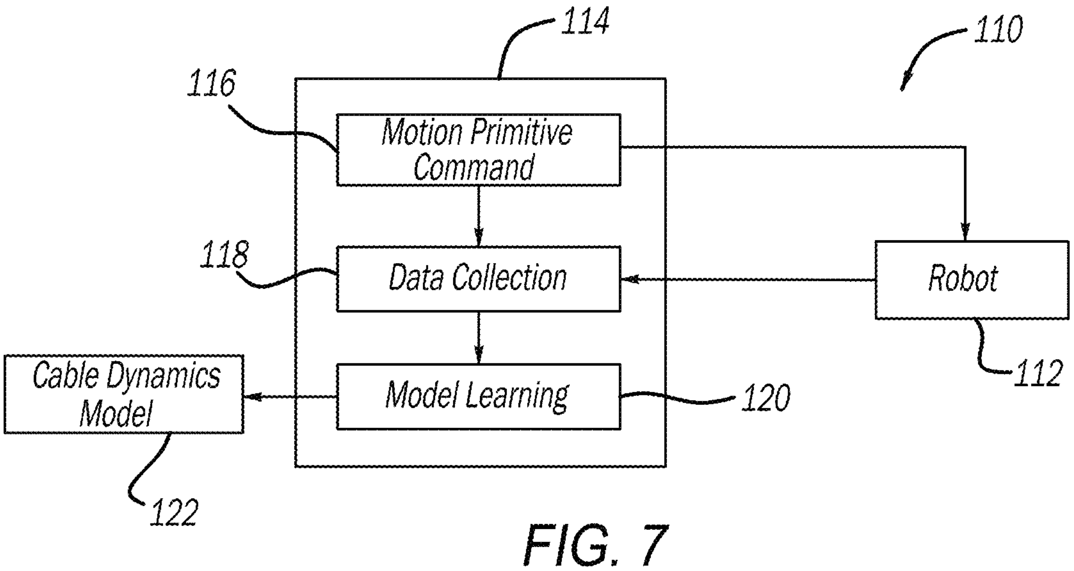
FIG. 7 is a block diagram of a learning phase system for a single robot wire harness manipulator system.

FIG. 7 is a block diagram of a learning phase system 110 for a single robot wire harness manipulator system, such as the system 60, that is used to learn the cable dynamics prior to the robot 12 being used to route the cable 14 through the fixtures 16. The learning phase system 110 includes a training robot 112 and a training computer 114. A motion primitive command module 116 provides motion command signals to the robot 112 to cause the robot 112 to grip and twist the cable 14 as described above to obtain the desired number of motion primitives, where those motion primitives are provided to a data collection module 118 and where the robot 112 provides external force robot pose signals to the data collection module 118 including measured signals from the joint torque sensor. The data collection module 118 provides the collected data to a model learning module 120 in the computer 114 to learn the cable dynamics using, for example, the equations above, and the model learning module 120 provides model learning information to a cable dynamics model module 122.

Figure 8:
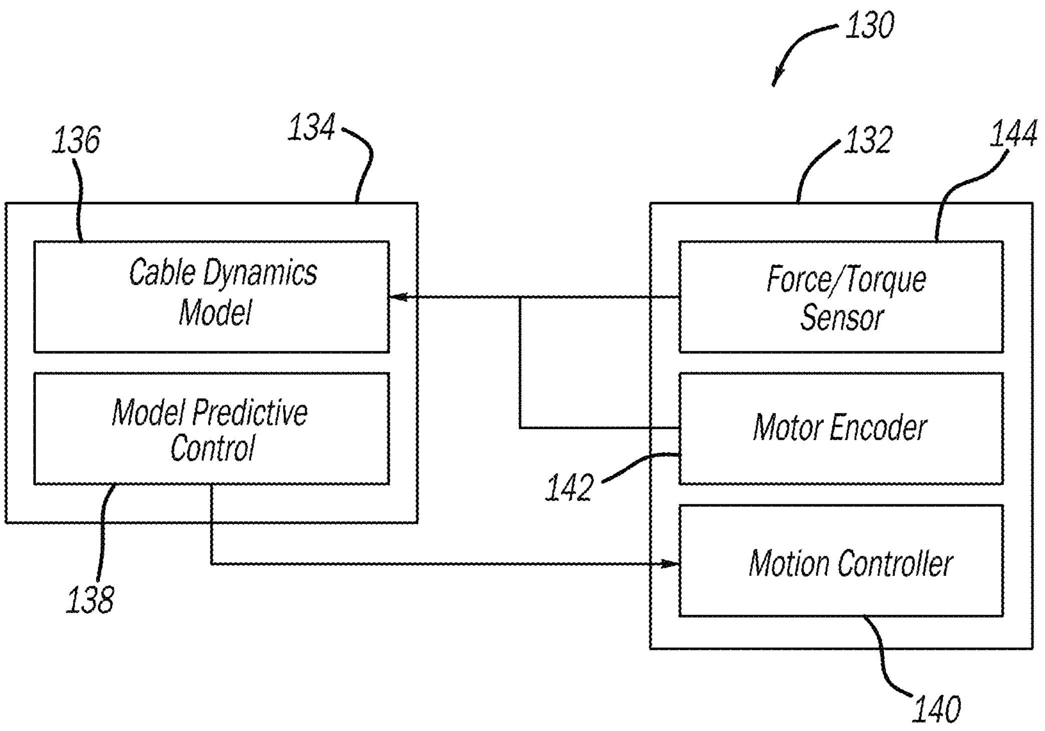
FIG. 8 is a block diagram of a task phase system for the single robot wire harness manipulator system.

FIG. 8 is a block diagram of a task phase system 130 for the single robot wire harness manipulator system that performs the actual routing of the cable 14 to the fixtures 16 based on the learned cable dynamics provided by the system 110. The task phase system 130 includes a robot 132 and a computer 134. The cable dynamics produced by the cable dynamics model module 122 is provided to a cable dynamics model module 136 in the computer 134. The cable dynamics model module 136 provides cable dynamics to a model predictive control module 138 in the computer 134 as discussed above, which provides motion command signals to a motion controller module 140 in the robot 132 that controls the motion of the robot 132 to route the cable 14 to the fixtures 16. A motor encoder 142 in the robot 132 provides the robot pose and the gripper position signals to the cable dynamics model module 136 and a force/torque sensor 144, such as a joint torque sensor, on the robot 132 provides the force or tension signals to the cable dynamics model module 136.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for routing and securing a cable to a plurality of fixtures mounted to a structure using a robot, said robot being controlled by a motion controller and including a cable gripper and a camera, said method comprising:

connecting an end of the cable to a fixed endpoint;

mapping a location and pose of the plurality of fixtures relative to the robot;

capturing images of the cable using the camera;

grasping the cable using the gripper and the images proximate the fixed endpoint;

twisting the cable using the gripper so as to provide a tension force on the cable between the gripper and the fixed endpoint;

sliding the gripper along the twisted cable away from the fixed endpoint and towards a target fixture while the cable is under tension;

generating a nonlinear cable dynamics model using a learning-based algorithm;

generating robot motion command signals using the cable dynamics model;

controlling movement of the robot using the robot motion command signals and robot pose and force measurements to route and secure the cable to the target fixture; and switching to routing the cable to a next fixture after the cable is connected to the target fixture.

2. The method according to claim 1 further comprising routing and securing the cable sequentially to each fixture in the same manner until the cable is secured to all of the plurality of fixtures.

3. The method according to claim 1 wherein generating robot motion command signals includes using a model predictive control (MPC) algorithm.

4. The method according to claim 1 wherein generating a nonlinear cable dynamics model using a learning-based algorithm includes modeling the cable dynamics model as a Koopman operator model that is fitted by the learning-based algorithm.

5. The method according to claim 1 further comprising determining two primitive motions including assembly primitives that insert the cable into the target fixture and the next fixture while maintaining tension on the cable and cable primitives that collect data.

6. The method according to claim 1 wherein grasping the cable using the gripper and the images includes determining a target pose of the cable based on the images, sending a target pose signal to the robot and sending a robot pose signal from the robot controller to a routing computer.

7. The method according to claim 1 wherein mapping a location and pose of the fixtures includes using a vision sensor.

8. The method according to claim 1 wherein mapping a location and pose of the target fixture and the next fixture includes providing waypoint planning that includes assigning waypoints to each of the plurality of fixtures.

9. The method according to claim 8 wherein the plurality of fixtures include C-shaped fixtures and U-shaped fixtures and wherein one type of waypoint is assigned to the C-shaped fixtures and another type of waypoint is assigned to the U-shaped fixtures.

10. The method according to claim 1 wherein the force measurements are obtained by measuring the tension force provided by twisting the cable using joint torque sensors or force sensors on the robot.

11. A method for routing and securing a cable to a plurality of fixtures mounted to a structure using a robot, said robot including a cable gripper, said method comprising:

grasping the cable using the gripper;

twisting the cable so as to provide a tension force on the cable;

sliding the gripper along the twisted cable while the cable is under tension;

generating a nonlinear cable dynamics model using a learning-based algorithm;

generating robot motion command signals using the cable dynamics model;

controlling movement of the robot using the robot motion command signals and robot pose and force measurements to route and secure the cable to the plurality of fixtures; and switching to routing the cable to a next fixture after the cable is connected to a target fixture.

12. The method according to claim 11 wherein generating robot motion command signals includes using a model predictive control (MPC) algorithm.

13. The method according to claim 11 wherein generating a nonlinear cable dynamics model using a learning-based algorithm includes modeling the cable dynamics model as a Koopman operator model that is fitted by the learning-based algorithm.

14. The method according to claim 11 further comprising determining two primitive motions including assembly primitives that insert the cable into the target fixture and the next fixture while maintaining tension on the cable and cable primitives that collect data.

15. A system for routing and securing a cable to a plurality of fixtures mounted to a structure using a robot, said robot being controlled by a motion controller and including a cable gripper and a camera, said system comprising:

means for mapping a location and pose of the plurality of fixtures relative to the robot;

means for capturing images of the cable using the camera;

means for grasping the cable using the gripper and the images proximate a fixed endpoint;

means for twisting the cable using the gripper so as to provide a tension force on the cable between the gripper and the fixed endpoint;

means for sliding the gripper along the twisted cable away from the fixed endpoint and towards a target fixture while the cable is under tension;

means for generating a nonlinear cable dynamics model using a learning-based algorithm;

means for generating robot motion command signals using the cable dynamics model;

means for controlling movement of the robot using the robot motion command signals and robot pose and force measurements to route and secure the cable to the target fixture; and means for switching to routing the cable to a next fixture after the cable is connected to the target fixture.

16. The system according to claim 15 further comprising means for routing and securing the cable sequentially to each fixture in the same manner until the cable is secured to all of the plurality of fixtures.

17. The system according to claim 15 wherein the means for generating robot motion command signals uses a model predictive control (MPC) algorithm.

18. The system according to claim 15 wherein the means for generating a nonlinear cable dynamics model using a learning-based algorithm models the cable dynamics model as a Koopman operator model that is fitted by the learning-based algorithm.

19. The system according to claim 15 further comprising means for determining two primitive motions including assembly primitives that insert the cable into the target fixture and the next fixture while maintaining tension on the cable and cable primitives that collect data.

20. The system according to claim 15 wherein the means for grasping the cable using the gripper and the images determines a target pose of the cable based on the images, sends a target pose signal to the robot and sends a robot pose signal from the robot controller to a routing computer.

* * * * *